United States Patent [19]

Rao

[11] Patent Number: 5,696,851
[45] Date of Patent: Dec. 9, 1997

[54] CODEWORD-DEPENDENT POST-FILTERING FOR VECTOR QUANTIZATION-BASED IMAGE COMPRESSION

[75] Inventor: Ashok Kolar Rao, Germantown, Md.

[73] Assignee: Comsat Corporation, Bethesda, Md.

[21] Appl. No.: 54,219

[22] Filed: Apr. 30, 1993

[51] Int. Cl.[6] .................................................. G06K 9/40
[52] U.S. Cl. ........................... 382/266; 382/253; 382/268
[58] Field of Search ................................ 382/54, 42, 56, 382/251, 252, 253, 264, 266, 268, 269, 275, 272, 277; 358/458, 447; 348/414, 422; 395/128

[56] References Cited

U.S. PATENT DOCUMENTS

| | | | |
|---|---|---|---|
| 5,003,618 | 3/1991 | Meno | 382/54 |
| 5,060,285 | 10/1991 | Dixit | 382/54 |
| 5,086,487 | 2/1992 | Katayama et al. | 382/56 |
| 5,111,285 | 5/1992 | Fujita et al. | 382/54 |
| 5,220,616 | 6/1993 | Downing | 382/268 |
| 5,282,051 | 1/1994 | Walker | 382/42 |
| 5,327,260 | 7/1994 | Shimomae et al. | 382/264 |
| 5,390,264 | 2/1995 | Ishihara et al. | 382/260 |
| 5,422,964 | 6/1995 | Devimeux et al. | 382/266 |
| 5,444,800 | 8/1995 | Kim | 382/239 |

*Primary Examiner*—Yon J. Couso
*Attorney, Agent, or Firm*—Sughrue,Mion,Zinn,Macpeak & Seas, PLLC

[57] ABSTRACT

The quality of reconstructed images is improved by a post-processing method at the decoder which uses codeword-dependent, spatially-varying 2-dimensional filters. The post-filtering, working across block boundaries, reduces coding artifacts and increases the signal-to-noise ratio. The technique is applicable for use with any VQ-based image compression and can also be used in conjunction with image magnification.

13 Claims, 1 Drawing Sheet

CODEWORD-DEPENDENT POST-FILTERING FOR VECTOR QUANTIZATION-BASED IMAGE COMPRESSION

BACKGROUND OF THE INVENTION

This present invention is directed to a method of obtaining improved picture quality in images reproduced from video signals which have been subjected to vector quantization (VQ)-based image compression.

Examples of vector quantization are disclosed in and commonly assigned applications Ser. Nos. 07/732,024 now abandoned and 07/759,361 now U.S. Pat. No. 5,487,086, the disclosures of which are incorporated herein by reference. The complexity of the search operations required in VQ limits the size of the codebook and the image quality.

An improvement over VQ is the "Simplified Vector Quantization" technique described in and commonly assigned application Ser. No. 07/866,851 filed Apr. 10, 1992 now U.S. Pat. No. 5,337,085, and in the paper entitled "A Vector Quantization-based Coding Scheme For TV Transmission Via Satellite," *Proceedings of the International Conference on Communications*, Chicago, June 1992, the disclosures of which are incorporated herein by reference. Due to the use of a specialized codebook, the Simplified Vector Quantization (SVQ) algorithm has a complexity which is independent of codebook size. The codebook, which assumes blocks of 4×4 pixels, has been designed to handle visually important features like edges. The baseline codebook shown in FIG. 1 consist of a uniform (d.c.) pattern and other commonly occurring edge patterns. In SVQ, a block is first approximated as a uniform block. If the approximation is good, then a codeword representing the d.c. pattern is transmitted along with the estimated d.c. value. If the coding distortion per pel is higher than a threshold, then the closest edge pattern is found using a fast search algorithm, and two scalars are then transmitted which are the average intensities of the two areas defining the edge.

While only 16 patterns are shown in the application Ser. No. 07/866,851 now U.S. Pat. No. 5,337,085, a more complex version may use a 128 pattern codebook. Input 4×4 blocks which are not coded well (coding distortion per pel being greater than the threshold), are split into 2×2 blocks and coded using a similar SVQ scheme. At the decoder, the index of the pattern along with the one or two scalars are used to reconstruct the block.

From the above description and FIG. 1, it is clear that SVQ does not exploit the correlation between pixels in different blocks. At higher compression ratios, more blocks are coded as d.c. blocks. This causes blocking and staircasing effects to appear. Even otherwise, if there is wide variation in pixel intensities within a block, as in the case of smooth edges and gradients, the coding distortion can sometimes be high even after 2×2 block coding.

The SVQ encoding scheme can be thought of as an adaptive 2-dimensional sub-sampling scheme. By taking the average of pixel intensities in a certain region, the encoder is actually performing anti-aliasing pre-filtering in the direction of minimum intensity variation. Subsequently, only the average is retained, this being equivalent to sub-sampling. Basic sampling theory then requires that post-filtering be performed, after the interpolation at the decoder, in order to accurately reconstruct the signal. At present, the SVQ decoder replicates the average value which was transmitted.

Various post-processing techniques have been suggested in the literature for removing blocking artifacts and smoothing jagged edges, e.g., as described by H. Reeve and L Lim, "Reduction In Blocking Effects In Image Coding," *Proc. ICASSP '83*, Boston, pp. 1212–1215. Linear or non-linear 2-Dimensional filtering is usually used. However, most of these filters are designed heuristically and often cause blurring, loss of resolution and a decrease in signal-to-noise ratio. Some techniques try to maintain resolution by identifying edges and changing the filtering strategy in the vicinity of these edges. The accuracy of the edge identification affects the quality, and some loss in resolution is inevitable.

Clearly, a more intelligent interpolative-filtering scheme can improve the quality of the reconstructed image.

SUMMARY OF THE INVENTION

It is therefore an object of the present invention to improve the quality of images reproduced from signals which have been subjected to VQ-based image compression. According to the preferred embodiment of this invention such improved image quality is achieved by a post-processing method at the decoder which uses codeword-dependent, spatially-varying 2-dimensional filters to yield significant improvements in picture quality. The post-filtering, working across block boundaries, reduces coding artifacts and increases the signal-to-noise ratio.

While the invention is particularly applicable for use with SVQ, it is equally applicable to many other commonly used VQ methods such as tree-structured VQ, and can also be used in conjunction with image magnification.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENT

The proposed invention is a post-filtering scheme which operates on the SVQ decoded image. It uses the transmitted information—specifically the pattern indices—to adjust the filter weights and consequently the major direction of filtering. The post-filtering will be different depending on whether 4×4 block coding or 2×2 block coding is performed. The 4×4 case will be addressed first.

Filter Structure

The post-filter consists of two-dimensional (2-D) filters for each pixel in the block, with the filter length being long enough to accommodate useful pixels in other blocks. Finite Impulse Response (FIR) filter structures are preferred in order to minimize hardware complexity, although other filters could be used. For the 4×4 case, it should be remembered that in a block there are only two possible intensity values. Thus, there is no point in including many pixels from the same block in the multiply/accumulate operation. A filter length of 6 has been found to be sufficient. Two filter structures—causal and non-causal—of length 6 are shown in FIGS. 2A and 2B, respectively.

In each of these figures, the block in the middle is the current block and contains a 4×4 array of 16 pixels. The pixels designated with an "X" are those used to filter the current block. The second pixel used in the current block is the other average transmitted value for the block.

Figure 1:
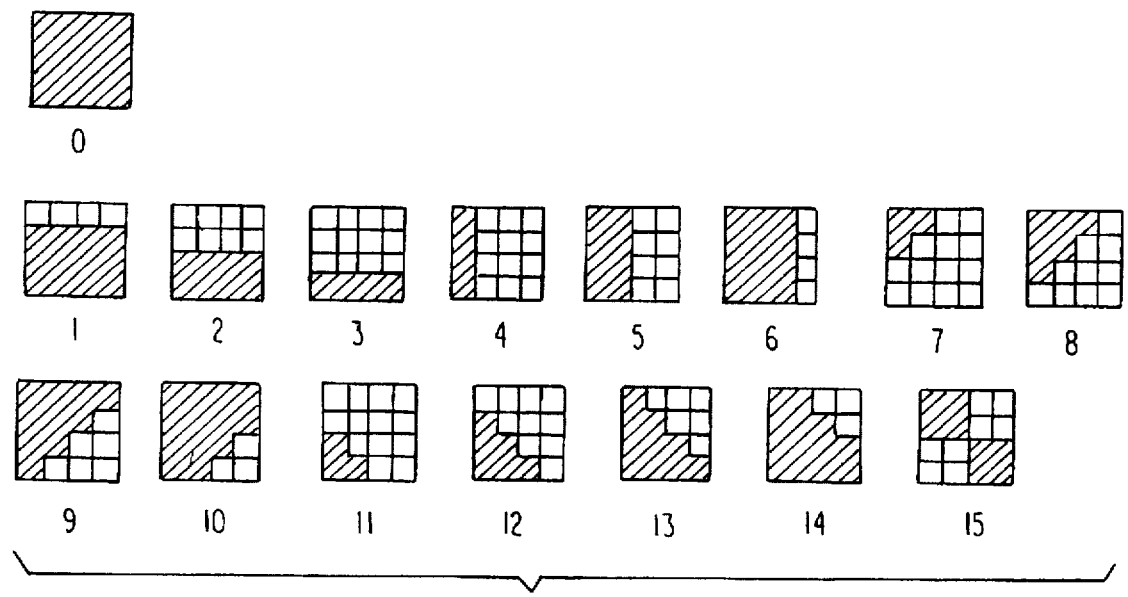
FIG. 1 is an illustration of a codebook of basic vectors for SVQ coding.
Figure 2A:
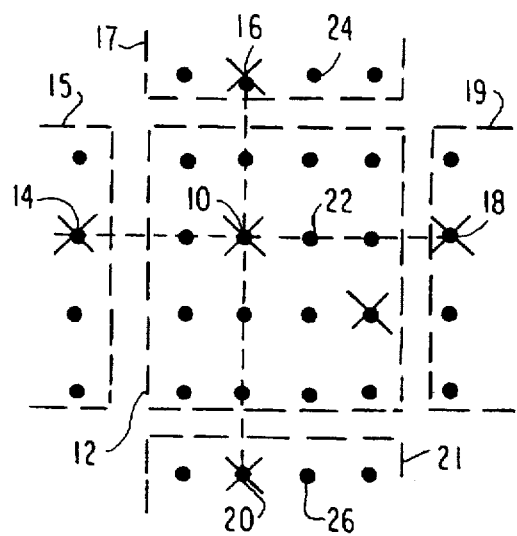
FIGS. 2A and 2B are illustrations of non-causal and causal filtering, respectively, in accordance with the present invention.
Figure 2B:
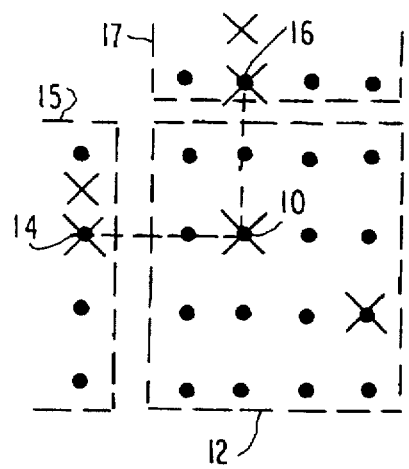

In the case illustrated in FIG. 2A, the pixel being processed is the pixel 10 in block 12. The filter considers the values of this pixel as well as the values of pixels 14, 16, 18 and 20 from each neighboring block 15, 17, 19 and 21, as well as a second pixel value from the same block 12. The filter works as is well known, e.g., multiplying these various pixel values by suitable coefficients to obtain a new value for the pixel 10. The second pixel value from the same block may not be in the position actually shown in FIG. 2A, but is simply the other average value transmitted for this block in the SVQ technique.

When subsequently processing the pixel 22, the pixels used would be pixels 22, 14, 24, 18 and 26, and again the second average value from the block 12 (i.e., the average value different from the average value associated with pixel 22). Thus, in each case the pixels from the adjacent blocks that are above, below and to either side of the pixel under consideration are used, along with the second average value in the present block.

For the causal filter structure in FIG. 2B, only image portions occurring prior to the pixel being processed may be considered. Thus, rather than use a pixel value from each of later blocks 19 and 21, the filter uses two pixel values from each of blocks 15 and 17. The second pixel value used from each of the blocks 15 and 17 is simply the other average value transmitted for that block, and may not be in the exact position of the second "X" in blocks 15 and 17 in the illustration of FIG. 2B. In case the neighboring block is a 2×2 block, the other pixel is the pixel directly above or to the left.

The non-causal filter requires additional line buffers and has a higher hardware complexity. Since it takes into account pixel correlations in all directions, its performance is superior to that of the causal implementation. In case the current block is a d.c. block, then the other pixel from the current block is set equal to zero. In the causal case, some additional complexity is introduced if the neighboring block has been coded as 2×2 blocks. In such a situation, the other pixel used is the pixel above (or to the left of) the neighboring block pixel in consideration. The filter structure is thus space-varying. The filter coefficients can be different for each of the 16 pixels in a block.

A good strategy for the interpolating filter is to filter along a direction of low intensity variation. Such directions will naturally depend on the pattern index of the current block and the pattern indices of neighboring blocks. Since there are 128 possible pattern indices, the number of combinations of pattern indices from the current and the four closest neighboring bands is very large. To simplify the problem, a block-class which can be thought of as an 11-bit binary word is created. The first seven bits give the pattern index of the current block. Each of the 4 neighboring blocks contributes an additional bit to the block class. The bit is set equal to '1' if the neighboring block is a d.c. block and set equal to '0' if it is not a d.c. block. In the causal case there are only 2 neighboring blocks, hence the block-class is only 9 bits long. The filter coefficients will vary with the block-class. A training procedure to obtain these coefficients will now be described.

Filter Design

The goal of the training procedure is to obtain filter coefficients for each block-class and pixel position within the 4×4 block which are optimum in some sense. A possible choice is the minimum mean-squared error (MMSE) criterion. The Recursive Least-Squares (RLS) technique, described by L. Ljung and T. Soderstrom, *Theory and Practice of Recursive Identification*, 1983, MIT Press, is used to find the MMSE estimate of the filter coefficients for each block-class and pixel position. The advantage of using the RLS technique is that matrix inversion can be avoided. The procedure uses a set of images as training data. With each incoming 4×4 image block, the 16 filters (one for each pixel position corresponding to its block-class k are recursively updated using the RLS algorithm as shown below:

$$\theta_i(j,k) = \theta_{i-1}(j,k) + \frac{P_{i-1}(j,k)\phi(j)}{1 + \phi^T(j)P_{i-1}(j,k)\phi(j)} [u(j) - \theta_{i-1}^T(j,k)\phi(j)]$$

and $$P_i(j,k) = P_{i-1}(j,k) - \frac{P_{i-1}(j,k)\phi(j)\phi^T(j)P_{i-1}(j,k)}{1 + \phi^T(j)P_{i-1}(j,k)\phi(j)}$$

for $j = 1, 2, \ldots, 16$.

where $\theta_i(j,k)$ is the N-dimensional (N=6 is the nominal value) filter coefficient vector estimate and $P_i(j,k)$ is the N×N RLS matrix at the i'th recursion for pixel j and block-class k. The N-dimensional vector $\phi(j)$ contains the SVQ decoded samples which are used in the filtering inner product operation as specified by FIGS. 2A and 2B, and $u(j)$ is the actual intensity value at the j'th position for the block under consideration. A standard 2-D low-pass filter is taken as the initial estimate for $\theta$ and P, although the choice of the initial estimate has very little effect on the final filter provided the training set is large and diverse so that there are enough data points for each block-class.

After all of the blocks in all training images are processed, sets of filter coefficients are obtained which are optimal in that they minimize the mean-squared error between the post-filtered SVQ decoded blocks and the input images given this particular filter structure and block-class construct.

2×2 Block Filtering

The same concept can be used for 2×2 blocks. A non-causal filter implementation yields much better results in this case. The filter structure is similar to that in FIG. 2A, except that the blocks now have only four pixels. Since there are only 8 possible patterns in a 2×2 block, the block-class is now formed by concatenating the patterns of the current and three neighboring blocks (top, left and right). If a neighboring block was 4×4 coded, then its pattern is assumed to be a d.c. pattern for the purpose of forming the block-class. Since the block-class is formed by using the actual patterns of the neighboring blocks, and not just the d.c./edge information as in the 4×4 case, the filters can be adapted more effectively.

Filter Implementation

The training procedure yields a bank of filters. Each block-class is assigned 16 filters—one for each pixel position. The filter coefficients are stored at the decoder. The SVQ decoded blocks are processed sequentially. Depending on the block-class, the appropriate filter for each pixel for the block under consideration is used. After post-filtering, the image in most cases has greatly improved visual quality and signal-to-noise ratio.

The memory requirement for storing the filters can be calculated easily. For example, in the causal 4×4 block case, there are 512 block classes, so 512×16×6=49,152 filter coefficients have to be stored. Assuming one byte for each coefficient, the memory required is about 49 KBytes—which is quite reasonable. If memory is of concern, since many of the filters developed by the training procedure are expected to be similar, the filter set can be pruned with only a slight loss in optimality.

A more important concern for hardware implementation is the complexity of the filtering operation. In general, the filter coefficients will be different from pixel to pixel. Currently, high speed off-the-shelf FIR filters do not permit coefficient switching at very high rates, so that special hardware would need to be designed to implement the time varying filter operation. The data input to the filter is also dependent to some extent on the pattern-indices of the current and neighboring blocks and this will increase the complexity of the implementation.

Performance

Computer simulations have been used to test the performance of the post-filtering technique of this invention on SVQ encoded and decoded still images. Some standard images such as Lena and Peppers have been used along with some test CCIR-601 resolution images and other images. For images inside the training set, the improvements in signal-to-noise after post-processing using post-filtering on both 4×4 coded blocks and 2×2 coded blocks are listed in Table I. Table II gives the results when images outside the training set are post-processed.

TABLE I

Post-processing Results for
Images Inside the Training Set

| Image | S/N without smoothing (dB) | S/N after smoothing (dB) | Bit Rate (bits/pel) |
|---|---|---|---|
| "Football" | 34.3 | 37.9 | 1.4 |
| "Mobile and Calendar" | 32.7 | 35.5 | 2.0 |
| "Flower Garden" | 32.2 | 36.1 | 2.3 |
| "Lena" | 35.7 | 37.9 | 1.3 |
| "Peppers" | 35.3 | 36.6 | 1.3 |

TABLE II

Post-processing Results for
Images Outside the Training Set

| Image | S/N without smoothing (dB) | S/N after smoothing (dB) | Bit Rate (bits/pel) |
|---|---|---|---|
| "Football-2" | 36.2 | 38.2 | 1.4 |
| "Indiana Jones" | 34.9 | 36.3 | 1.1 |

Apart from increase in S/N, the visual quality is improved for most images. Blocking and staircasing artifacts are almost totally removed without loss of resolution.

The technique of this invention is unique in many respects. Most VQ schemes assume that since the chosen codeword is at the minimum distance from the input block, post-filtering is unnecessary and quality improvements can only come by better or larger codebooks. The concept that the correlation between blocks can be used to improve the reconstruction of blocks at the decoder (as opposed to merely reducing the bit rate) has not before been recognized in the literature. Unlike heuristic post-processing methods, the approach of this invention uses the compressed data to identify appropriate post-filters which are optimal in some sense. In the context of Simplified Vector Quantization, the post-processing is actually post-interpolative filtering and is therefore not only desirable but also necessary.

Any VQ scheme in which the edge information for a block can be expressed in a limited number of bits is a candidate for the proposed optimal post-filter. For example, in Tree-structured VQ, a transmitted codeword (which can be as many as 20 bits long), is related to a much shorter codeword at a lower depth in the tree. These shorter codewords can be used to construct a block-class. Training can be performed exactly as shown above to develop optimal post-filters for each block-class. Thus, the present invention is not restricted to SVQ but encompasses a wide range of VQ-based compression methods.

In addition, the invention could be used to improve the quality of images in an image magnification system. For example, image magnification can be achieved by pixel replication, the edges identified, and then the post-filtering technique of the present invention applied to the reconstructed image to improve its quality.

What is claimed is:

1. A method of improving the quality of a reproduced image, said image comprising a plurality of blocks of pixels, each block including a plurality of pixels and each pixel associated with a pixel value, said method comprising the steps of:

storing pixel data comprising the pixel values associated with each pixel and representing at least a portion of said image;

defining blocks of said pixels, each block comprising a two-dimensional array of pixels;

selecting from said stored pixel data at least one pixel value corresponding to one pixel from a current block and plural pixel values corresponding to pixels from plural blocks adjacent to said current block;

calculating a new pixel value in accordance with the selected pixel values;

substituting the new pixel value for the one pixel value selected from said stored pixel data to obtain new pixel data representing an enhanced version of said portion of said image; and reproducing said image in accordance with said new pixel data.

2. A method according to claim 1, wherein said selecting step comprises selecting a pixel value from each of plural adjacent blocks, with the selected pixel value from each adjacent block corresponding to a pixel in said each adjacent block which is the shortest distance from said one pixel in said image.

3. A method according to claim 1, wherein said selecting step comprises the selecting of a second pixel value from said current block.

4. A method according to claim 1, wherein said pixels occur in said image in a sequence, and said selecting step comprises selecting only pixel values corresponding to pixels occurring in said image prior to said one pixel.

5. A method according to claim 1, wherein said pixels occur in said image in a sequence, and said selecting step comprises selecting pixel values corresponding to pixels occurring in said image both prior to and subsequent to said one pixel.

6. A method according to claim 1, wherein said stored pixel data is derived from a compressed image signal in which pixels have been grouped into said blocks for purposes of image compression.

7. A method according to claim 1, wherein said blocks each contain the same number of pixels.

8. A method according to claim 1, wherein none of the pixel values selected during said selecting step and corresponding to a pixel from an adjacent block corresponds to a pixel adjacent to said one pixel.

9. A method according to claim 1, wherein said pixel data is stored in a buffer.

10. A method of improving the quality of a reproduced image represented by a plurality of pixels occurring in said image in a sequence, said image comprising a plurality of blocks of said pixels, each block including a plurality of pixels and each pixel associated with a pixel value, said method comprising the steps of:

- storing pixel data comprising the pixel values associated with each pixel and representing at least a portion of said image;
- defining blocks of said pixels, each block comprising a two-dimensional array of pixels;
- selecting from said stored pixel data at least one pixel value corresponding to one pixel from a current block and at least one pixel value corresponding to a pixel from an adjacent block, with all selected pixel values other than said one pixel value corresponding to pixels occurring in said image prior to said-one pixel;
- calculating a new pixel value in accordance with the selected pixel values;
- substituting the new pixel value for the one pixel value selected from said stored pixel data to obtain new pixel data representing an enhanced version of said portion of said image; and
- reproducing said image in accordance with said new pixel data.

11. A method according to claim 10, wherein said pixel data is stored in a buffer.

12. A method of improving the quality of a reproduced image, said image comprising a plurality of blocks of pixels, each block including a plurality of pixels and each pixel associated with a pixel value, said method comprising the steps of:

- storing pixel data comprising the pixel values associated with each pixel and representing at least a portion of said image;
- defining blocks of said pixels, each block comprising a two-dimensional array of pixels;
- selecting from said stored pixel data at least one pixel value corresponding to current pixel from a current block and at least one pixel value corresponding to a pixel from an adjacent block, wherein, for at least some pixels selected as said current pixel, none of the pixel values selected during said selecting step and corresponding to a pixel from an adjacent block corresponds to a pixel adjacent to said current pixel;
- calculating a new pixel value in accordance with the selected pixel values;
- substituting the new pixel value for the one pixel value selected from said stored pixel data to obtain new pixel data representing an enhanced version of said portion of said image; and
- reproducing said image in accordance with said new pixel data.

13. A method according to claim 12, wherein said pixel data is stored in a buffer.

* * * * *